United States Patent [19]

Zones

[11] Patent Number: 4,626,421
[45] Date of Patent: Dec. 2, 1986

[54] PREPARATION OF MAGADIITE

[75] Inventor: Stacey I. Zones, San Francisco, Calif.

[73] Assignee: Chevron Research Company, San Francisco, Calif.

[21] Appl. No.: 750,373

[22] Filed: Jun. 28, 1985

[51] Int. Cl.$^4$ ............................................. C01B 33/28
[52] U.S. Cl. ...................... 423/326; 423/329; 423/332; 423/333; 423/328; 502/60; 502/77; 502/232
[58] Field of Search ............... 423/326, 332, 328, 329, 423/333; 502/77, 232

[56] References Cited

U.S. PATENT DOCUMENTS

| | | | |
|---|---|---|---|
| 4,100,262 | 7/1978 | Pelrine | 423/329 |
| 4,285,922 | 8/1981 | Audeh et al. | 423/329 |
| 4,410,637 | 10/1983 | Kortbeek et al. | 502/257 |
| 4,430,314 | 2/1984 | Audeh et al. | 423/326 |
| 4,462,971 | 7/1984 | Hinnenkamp et al. | 423/328 |
| 4,472,366 | 9/1984 | Takahashi et al. | 423/328 |
| 4,481,174 | 11/1984 | Baacke et al. | 423/306 |
| 4,481,177 | 11/1984 | Valyocsik | 423/329 |
| 4,519,998 | 5/1985 | Lamshangleen | 423/277 |
| 4,544,538 | 10/1985 | Zones | 423/326 |
| 4,578,258 | 3/1986 | Rieck | 423/325 |
| 4,581,213 | 4/1986 | Rieck | 423/329 |

FOREIGN PATENT DOCUMENTS

| | | | |
|---|---|---|---|
| 0042225 | 12/1981 | European Pat. Off. | 423/329 |
| 0077624 | 4/1983 | European Pat. Off. | 423/328 |
| 2125390 | 3/1984 | United Kingdom | 423/328 |

Primary Examiner—John Doll
Assistant Examiner—Jackson Leeds
Attorney, Agent, or Firm—S. R. LaPaglia; W. K. Turner; V. J. Cavalieri

[57] ABSTRACT

A method for preparing magadiite is described wherein the reaction mixture for crystallization thereof contains as a promoter, a hydrocarbon substituted urea or amide. The magadiite prepared according to this method may act as a source of silica in preparing crystalline zeolites or molecular sieves.

5 Claims, No Drawings

PREPARATION OF MAGADIITE

BACKGROUND OF THE INVENTION

1. Field of the Invention

This invention relates to a method for preparing magadiite requiring a reaction mixture for crystallization thereof which contains as a promoter, a hydrocarbon substituted urea or amide.

2. Description of the Prior Art

Magadiite is a natural or synthetic sodium silicate hydrate with a layered structure having a composition approximating to $Na_2Si_{14}O_{29} \cdot 11H_2O$. Natural magadiite may be obtained from lake beds at Lake Magadi, Kenya or has an X-ray diffraction pattern as described by Eugster, H. P., Hydrous Sodium Silicates from Lake Magadi, Kenya; Precursors of Bedded Chert., Science, 157, 1177–1180 (1967) which is incorporated herein by reference. Synthetic magadiite may be prepared from methods known in the art, for example, Lagaly, G. and Beneke, K., Amer. Mineralog. 60, 642–649, 1975. The hydrogen form of magadiite may be prepared by methods described by Lagaly, G. and Beneke, K., Amer. Mineralog., 60, 650–658, 1975.

The problem with the prior art synthetic methods for preparing magadiite is the relatively long reaction times required to prepare the material.

It has now been discovered that reaction times may be considerably shortened by the use of hydrocarbon substituted ureas or amides, as described hereinbelow.

The magadiite prepared according to this invention is a particularly attractive source of silica as it enables useful crystalline zeolites or molecular sieves to be prepared inexpensively, easily, and in a more purer, larger and ordered form.

SUMMARY OF THE INVENTION

The present invention is directed to a method of preparing magadiite or an alkali metal form of magadiite which comprises:

preparing a mixture containing $M^+OH^-$ an alkali metal hydroxide, a source of silica dioxide, water and as a promoter, a hydrocarbon substituted urea or hydrocarbon substituted amide or mixtures thereof and having a composition in terms of mole ratios of oxides falling within the following ranges:

$M^+OH^-/SiO_2 = 0.25$ to $0.8$
promoter/$SiO_2 = 0.05$ to $0.5$
$H_2O/SiO_2 =$ at least $30:1$ wherein $M^+OH^-$ is an alkali metal hydroxide, and maintaining said mixture under crystallization conditions until crystals of said magadiite are formed.

The magadiite prepared by the above procedure may be converted to the hydrogen form by treating the product so formed with an inorganic mineral acid or carboxylic acid such as hydrochloric acid, sulfuric acid, chloroacetic, trifluoroacetic, and the like.

DETAILED DESCRIPTION

The method of preparing synthetic magadiite of this invention comprises preparing a mixture containing an alkali metal hydroxide, a source of silica dioxide, water and as a promoter, a hydrocarbon substituted urea or amide and mixtures thereof and having a composition in terms of mole ratios of oxides falling within the following ranges:

|  | Broad | Narrow |
| --- | --- | --- |
| $M^+OH^-/SiO_2$ | = 0.25 to 0.80 | 0.55 to 0.65 |
| promoter/$SiO_2$ | = 0.05 to 0.50 | 0.1 to 0.20 |
| $H_2O/SiO_2$ | = at least 30:1 | | wherein $M^+OH^-$ is an alkali metal hydroxide, and maintaining said mixture under crystallization conditions until crystals of said magadiite are formed.

Typical silicon oxide sources in preparing magadiite include silicates, silica hydrogel, silica acid, colloidal silica, etc. Preferably, the alkali metal hydroxide includes lithium, potassium, and sodium hydroxide. Sodium hydroxide is the most preferred alkali metal hydroxide. Temperatures for the process range from about 100° C. to about 175° C. and preferably 130° C. to 160° C., and crystallization times range from about 50 to 150 hours. Preferably, the hydrothermal crystallization is performed under pressure in an autoclave or static bomb reactor so that the reaction mixture is subject to autogenous pressure. The reaction mixture can be stirred during crystallization.

Once the product crystals have formed, the solid product is separated from the reaction mixture by standard mechanical separation techniques such as filtration. The crystals are water-washed and then dried, e.g., at 90° C. to 150° C. for from 8 to 24 hours, to obtain the as synthesized product. The drying step can be performed at atmospheric or subatmospheric pressures. The magadiite formed by the process may be converted to H-magadiite by treating the magadiite with an acidic material such as aqueous hydrochloric acid, by methods known in the art.

Prior art synthetic methods, without the presence of the hydrocarbon substituted urea or amide promoters, would take considerably longer to obtain crystalline product. The hydrocarbon group may also be interrupted with O, S, or N and is included within the scope of the term.

Preferably, the hydrocarbon substituted urea has the formula:

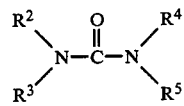

where $R^2$ and $R^3$ are the same or different and each is H, lower alkyl of 1 to 5 carbon atoms or $R^2$ and $R^3$ together with the nitrogen to which they are attached form an alkylene group containing 4 to 7 carbon atoms which may be interrupted by an O, S or N atom; $R^4$ and $R^5$ are the same or different and each is H, lower alkyl of 1 to 5 carbon atoms or $R^4$ and $R^5$ together with the nitrogen to which they are attached form an alkylene group containing 4 to 7 carbon atoms which may be interrupted by an O, S or N atom, with the proviso that $R^2$, $R^3$, $R^4$ and $R^5$ cannot all be hydrogen at the same time. More preferably, $R^2$, $R^3$, $R^4$ and $R^5$ are the same or different and each is H or lower alkyl with the proviso that each cannot be hydrogen at the same time.

Preferably, the hydrocarbon substituted amide has the formula:

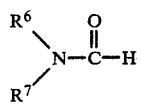

wherein $R^6$ and $R^7$ are H or lower alkyl containing 1 to 5 carbon atoms or $R^6$ and $R^7$ together with the nitrogen to which they are attached form an alkylene group containing 4 to 7 carbon atoms which may be interrupted by an O, S, or N atom with the proviso that both $R^6$ and $R^7$ cannot be hydrogen at the same time. More preferably, $R^6$ and $R^7$ are H or lower alkyl with the proviso that both cannot be hydrogen at the same time.

Crystalline zeolites can be prepared using magadiite prepared according to this invention, and particularly those of the ZSM type and various other type zeolites. ZSM type zeolites are exemplified by ZSM-5, ZSM-12, ZSM-35, ZSM-39, and ZSM-48 and other similar materials including aluminum free crystalline silicate molecular sieves. The preparation of crystalline zeolites or molecular sieves using magadiite as a source of silica is taught in co-pending U.S. patent application Ser. Nos. 708,629 and 708,759, both filed on Mar. 6, 1985 and both are incorporated herein by reference.

In order to more fully illustrate the nature of the invention and the manner of producing the same, the following examples are presented.

EXAMPLES

EXAMPLE 1

Preparation of a Synthetic Magadiite

A solution is formed from mixing 6 g of N,N,N',N'-tetramethylurea (Burdick and Jackson), 42.14 g of Banco sodium silicate solution (29.22 wt% $SiO_2$, 9.08% $Na_2O$), 0.80 g of concentrated sodium hydroxide solution (50% w/w), and 193 ml of water. There is no gelation or precipitation. The contents are loaded into a Teflon-lined stainless steel canister or reactor designed to operate under pressure. The canister or reactor is heated at 140° C. for seven days without agitation. Upon cooling the reactor, the contents are poured into a filter and the precipitated solids are washed several times with water and then air-dried. The product has the X-ray diffraction pattern shown in Table I.

TABLE I

| 2θ | d/n | Relative Int. |
|---|---|---|
| 5.71 | 15.48 | 72 |
| 11.44 | 7.73 | 5 |
| 12.20 | 7.25 | 1 |
| 17.15 | 5.17 | 7 |
| 17.70 | 5.01 | 2 |
| 19.82 | 4.48 | 3 |
| 22.12 | 4.02 | 1 |
| 24.45 | 3.641 | 5 |
| 25.02 | 3.559 | 8 |
| 25.82 | 3.450 | 28 |
| 26.93 | 3.311 | 16 |
| 28.29 | 3.155 | 23 |
| 29.80 | 2.998 | 1 |

EXAMPLE 2

Using 1.5 g of magadiite prepared according to Example 1, and adding in 15 ml $H_2O$, 0.16 g of $Al_2(SO_4)_3 \cdot 16H_2O$, and 0.30 g 50% NaOH, the solid magadiite was slurried in the Teflon liner of a Parr 4749 pressure reactor. Two grams of tetrapropylammonium bromide were added as the organocation which will specify the zeolite to be formed. The reactor was sealed and heated for 72 hours at 180° C. without agitation. Upon cooling the product is recovered by filtration and dried after several washings. A zeolite was produced which is ZSM-5 by X-ray diffraction. The zeolite contains 2.5% $Al_2O_3$.

EXAMPLE 3

Synthesis of SSZ-15 Zeolite from Magadiite

A solution was prepared comprising 1.55 g of magadiite (as prepared in Example 1), 2.0 g of N,N,N-trimethylcyclopentyl ammonium iodide, 15 ml $H_2O$, and 0.02 g of concentrated NaOH. The contents are mixed in a Teflon-lined stainless steel reactor and heated at 200° C. for three days. The product is recovered by filtration and dried after several washings. The X-ray diffraction pattern of the all-silica SSZ-15 zeolite is given in Table II and conforms to that given in U.S. application Ser. No. 437,709 filed on Oct. 29, 1982 and which is incorporated herein by reference.

TABLE II

| 2θ | d/n | Relative Int. |
|---|---|---|
| 4.45 | 19.86 | 3 |
| 8.06 | 10.97 | 7 |
| 9.67 | 9.15 | 19 |
| 11.75 | 7.53 | 3 |
| 13.00 | 6.81 | 2 |
| 14.88 | 5.95 | 1 |
| 15.31 | 5.79 | 2 |
| 19.24 | 4.61 | 47 |
| 19.92 | 4.46 | 16 |
| 20.70 | 4.29 | 77 |
| 21.72 | 4.09 | 6 |
| 22.37 | 3.974 | 34 |
| 23.65 | 3.76 | 7 |
| 24.15 | 3.685 | 10 |
| 24.91 | 3.574 | 18 |
| 26.11 | 3.413 | 5 |
| 26.72 | 3.336 | 15 |
| 26.97 | 3.306 | 2 |
| 27.33 | 3.263 | 20 |
| 27.62 | 3.230 | 7 |
| 28.75 | 3.105 | 3 |
| 29.09 | 3.070 | 3 |
| 29.87 | 2.99 | 3 |

The X-ray powder diffraction patterns for the magadiite of Example 1 and the prepared zeolites were determined using standard techniques. The radiation was K-alpha/doublet of copper and a scintillation counter spectrometer with a strip-chart pen recorder was used. The peak heights I and the positions as a function of 2θ where θ is the Bragg angle, were read from the spectrometer chart. From these measured values, the relative intensities, 100 $I/I_o$, where $I_o$ is the intensity of the strongest line or peak, and d, the interplanar spacing in Angstroms corresponding to the recorded lines, can be calculated. The X-ray diffraction pattern obtained for each of the products corresponded with the known pattern.

What is claimed is:

1. In the method for preparing magadiite or an alkali metal form of magadiite from an aqueous reaction mixture containing an alkali metal hydroxide and a source of silica oxide, the improvement which comprises adding to said aqueous reaction mixture a promoter selected from the group consisting of a hydrocarbon substituted urea and hydrocarbon substituted amide or mixtures thereof wherein the hydrocarbon substituted urea has the formula:

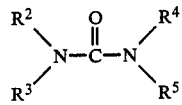

wherein $R^2$ and $R^3$ are the same or different and each is H, lower alkyl of 1 to 5 carbon atoms or $R^2$ and $R^3$ together with the nitrogen to which they are attached form an alkylene group containing 4 to 7 carbon atoms which may be interrupted by an O, S or N atom; $R^4$ and $R^5$ are the same or different and each is H, lower alkyl of 1 to 5 carbon atoms or $R^4$ and $R^5$ together with the nitrogen to which they are attached form an alkylene group containing 4 to 7 carbon atoms which may be interrupted by an O, S or N atom, with the proviso that $R^2$, $R^3$ $R^4$ and $R^5$ cannot all be hydrogen at the same time, the hydrocarbon substituted amide has the formula:

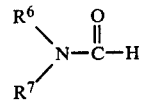

wherein $R^6$ and $R^7$ are H or lower alkyl containing 1 to 5 carbon atoms or $R^6$ or $R^7$ together with the nitrogen to which they are attached form an alkylene group containing 4 to 7 carbon atoms which may be interrupted by an O, S or N atom, with the proviso that both $R^6$ and $R^7$ cannot be hydrogen at the same time.

2. The method of claim 1 which contains an additional step of treating the product formed therein under acidic conditions in order to form the hydrogen form of magadiite.

3. The method of claim 1 wherein the hydrocarbon substituted urea is N,N,N',N'-tetramethylurea.

4. A method according to claim 1 wherein in the hydrocarbon substituted urea, $R^2$, $R^3$, $R^4$ and $R^5$ are the same or different and each is hydrogen or lower alkyl of 1 to 5 carbon atoms with the proviso that each cannot be hydrogen at the same time.

5. The method of claim 1 wherein in the hydrocarbon substituted amide, $R^6$ and $R^7$ are hydrogen or lower alkyl of 1 to 5 carbon atoms with the proviso that both cannot be hydrogen at the same time.

* * * * *